United States Patent [19]

Subrahmaniam et al.

[11] Patent Number: 5,671,352
[45] Date of Patent: Sep. 23, 1997

[54] ERROR INJECTION TO A BEHAVIORAL MODEL

[75] Inventors: Ramesh Subrahmaniam, Union City; Elizabeth George, Sunnyvale, both of Calif.

[73] Assignee: Sun Microsystems, Inc., Mountain View, Calif.

[21] Appl. No.: 499,202

[22] Filed: Jul. 7, 1995

[51] Int. Cl.$^6$ .................................................. G06F 11/00
[52] U.S. Cl. ........................... 395/183.17; 395/183.14; 395/183.09
[58] Field of Search ................... 395/183.09, 183.17, 395/500, 183.14, 183.01, 183.07; 371/25.1, 26, 27, 40.1, 40.3

[56] References Cited

U.S. PATENT DOCUMENTS

| | | | |
|---|---|---|---|
| 4,228,537 | 10/1980 | Henckels et al. | 371/26 |
| 4,242,751 | 12/1980 | Henckels et al. | 371/22.6 |
| 4,656,631 | 4/1987 | Nowak | 395/183.17 |
| 4,727,545 | 2/1988 | Glackemeyer et al. | 395/183.09 |
| 4,759,019 | 7/1988 | Bentley et al. | 395/183.09 |
| 4,999,837 | 3/1991 | Reynolds et al. | 371/3 |
| 5,003,466 | 3/1991 | Schan et al. | 395/183.17 |
| 5,046,068 | 9/1991 | Kubo et al. | 395/183.17 |
| 5,475,624 | 12/1995 | West | 371/25.1 |
| 5,485,572 | 1/1996 | Overley | 371/40.1 |
| 5,513,339 | 4/1996 | Agrawal et al. | 371/25.1 |

OTHER PUBLICATIONS

Apgar, "Interactive Animation of Fault Tolerant Parallel Algorithms", Visual Languiages, IEEE Workshop, pp. 11–17 1992.

Han et al. "Doctor:An Intefrated Software Fault Injection Environment for Distributed Real Time Systems", Computer Performance and Dependability, IEEE Int'l Symposium, pp. 204–213 1995.

Meyer et al., "Fast, Accurate, Integrated Gate- and Switch-Level Fault Simulation", European test conference, IEEE, pp. 194–199 1993.

Jenn et al., "Fault Injection into VHDL Models: The Mefisto Tool", IEEE Fault tolerant Computing, Int'l Symposium, pp. 66–75 1994.

Arlat et al., "Fault Injection for Dependability Validation: A Methodology and Some Applications", IEEE, Transactions on Software Engineering, vol. 16, Iss. 2, pp. 166–182 Feb. 1990.

Shin et al. "A Distributed Real–Time Operating System", IEEE Software, vol. 9, Iss. 5, pp. 58–68 Sep. 1992.

Guthoff et al. "Combining Software Implemented and Simulation Based Fault Injection into a Single Fault Injection Method", IEEE Fault tolerant Computing, 1995 Symposium, pp. 196–206 1995.

Primary Examiner—Robert W. Beausoliel, Jr.
Assistant Examiner—Joseph E. Palys
Attorney, Agent, or Firm—Blakely Sokoloff Taylor & Zafman

[57] ABSTRACT

A method and an apparatus for a dynamic error injection mechanism used in conjunction with a behavioral simulator in testing simulated hardware and software, and more particularly the testing of error handling code. In one implementation of the invention, Sun Microsystem's MPSAS (MULTI-PROCESSOR SPARC ARCHITECTURAL SIMULATOR) may be utilized as a behavioral model to implement the present invention. With the present invention, a range of addresses may be specified within which to test such errors. When such a command is issued, MPSAS logs the error and address range. Simulation can then be continued. At the next access to the address range to be tested with for a specific error, the present invention triggers off simulated hardware actions which would be taken in an actual hardware upon its encountering the same error. If the corresponding error handlers are turned on by the software of the present invention, the trap will be taken and the code will vector off to the error handler. This enables an operating system developer to test the error handling code.

20 Claims, 6 Drawing Sheets

ERROR INJECTION TO A BEHAVIORAL MODEL

BACKGROUND OF THE INVENTION

(1) Field of the Invention

The field of the invention is error testing and behavioral simulators. More specifically, the present invention is related to the method and apparatus for a dynamic error injection mechanism for testing systems simulated by behavioral simulators such as the Sun Microsystem's MPSAS (MULTI-PROCESSOR SPARC ARCHITECTURAL SIMULATOR).

(2) Prior Art

Typically in the testing of real hardware, the occurrence of errors are unpredictable and therefore, hard to test. Traditionally, prearranged test vectors are input in the testing of real hardware in order to trap as many errors as possible. The testing of simulated hardware is equally difficult. It is especially difficult to test software based error handlers used for handling hardware errors.

In the past, error handling codes in an operating system have been virtually untested. This is basically due to the fact that errors typically handled by error handling code, including Ecache tag parity errors, system address parity errors, correctable and uncorrectable errors, can only be tested when such errors actually occur in the real hardware. In addition, such errors cannot be reproduced at will. Most existing simulators do not have the mechanism to test the software aspect of error handlers. Consequently, software developers must typically wait until the actual hardware is ready.

More specifically, there are many types of errors and combination of errors including correctable, uncorrectable and fatal errors, and a typical test method is not able to test the vast range of error types. It is therefore desirable to have a method and an apparatus which allows testing of error handling code on a simulated hardware in an efficient and flexible manner. Such method and apparatus would allow testing of a vast array of errors and testing of a range of addresses in a simulated system.

BRIEF SUMMARY OF THE INVENTION

A method and an apparatus for a dynamic error injection mechanism used in conjunction with a behavioral simulator in testing simulated hardware and software, and more particularly the testing of error handling code implemented with such simulated hardware are disclosed.

In one implementation of the invention, Sun Microsystem's MPSAS (MULTI-PROCESSOR SPARC ARCHITECTURAL SIMULATOR) may be utilized as a behavioral model to implement the present invention. The behavioral model of the Sun Microsystem's MPSAS has a user interface. The method and apparatus of the present invention provides several commands at this interface level to control the kernel simulation that is running at the user interface level. Once such existing command enables the user to stop the simulation at any point of its execution, a new command referred to herein as "inject error" may be used to specify errors to be tested and the address range to be tested.

With the present invention, a range of addresses may also be specified within which to test such errors. When such a command is issued, MPSAS logs the error and address range. Simulation can then be continued. At the next access to the address range to be tested for a specific error, the present invention triggers off simulated hardware actions which would be taken in an actual hardware upon its encountering the same error. If the corresponding error handlers are enabled, the trap will be taken and the code will vector off to the error handling code. This enables an operating system developer to test the error handling code. A trap typically refers to an unprogrammed conditional jump to a specified address that is automatically activated by hardware. The use of a trap in relation to an error handling code would be well understood by a person skilled in the art given the description of the invention herein.

The present invention can also achieve the same end by using prearranged or special traps in the architecture of the system being simulated. The operating system may use these special traps to invoke the present invention. The present invention provides a mechanism for software developers to test the software portion of the error handling code in an efficient and convenient manner. The present invention enables users to not only test errors at will during any point of execution of the simulated system but to also specify the error type and address range to be tested. The present invention therefore provides for a dynamic error testing capability to test error handling code and allows for testing of a broad range of errors and addresses. Further, the present invention allows software developers to test error handling code with a hardware long before the actual hardware is developed.

DETAILED DESCRIPTION OF THE INVENTION

A method and an apparatus for dynamically injecting errors in a behavioral model simulated by a behavioral simulator to test simulated hardware and error handling code are disclosed.

Figure 1:
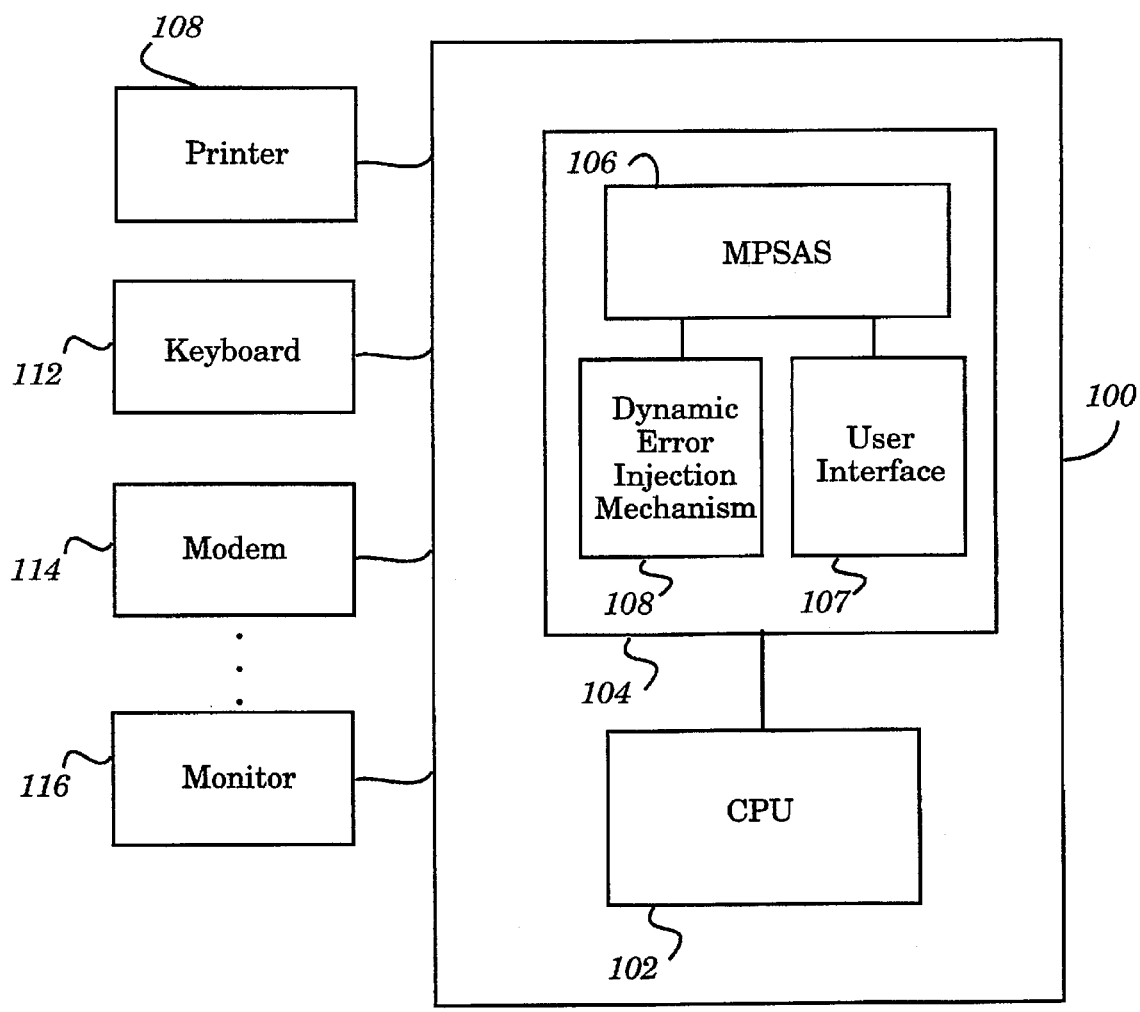
FIG. 1 illustrates a system block diagram showing an exemplary implementation of the present invention's dynamic error injection mechanism.

FIG. 1 illustrates a system block diagram showing an exemplary implementation of the present invention's dynamic error injection mechanism. Computer 100 has a CPU 102 coupled to memory 104. Computer 100 may be coupled to several peripheral devices including printer 110, keyboard 112, modem 114 and monitor 116. Memory 104 has a behavioral simulator 106 coupled to dynamic error injection mechanism 108. The behavioral simulator may be implemented using one of many available simulators including Sun Microsystem's MPSAS (MULTI-PROCESSOR SPARC ARCHITECTURAL SIMULATOR). Behavioral simulator 106 is also coupled to user interface 107 allowing for a user to input the type of error and address range in which the user would like the particular error to occur and to be tested.

Dynamic error injection mechanism 108 allows an operating system developer to inject errors dynamically at any point during a simulation of hardware/software by behavioral simulator 106. The type of error may include any variety of errors including correctable, uncorrectable and fatal errors.

Figure 2:
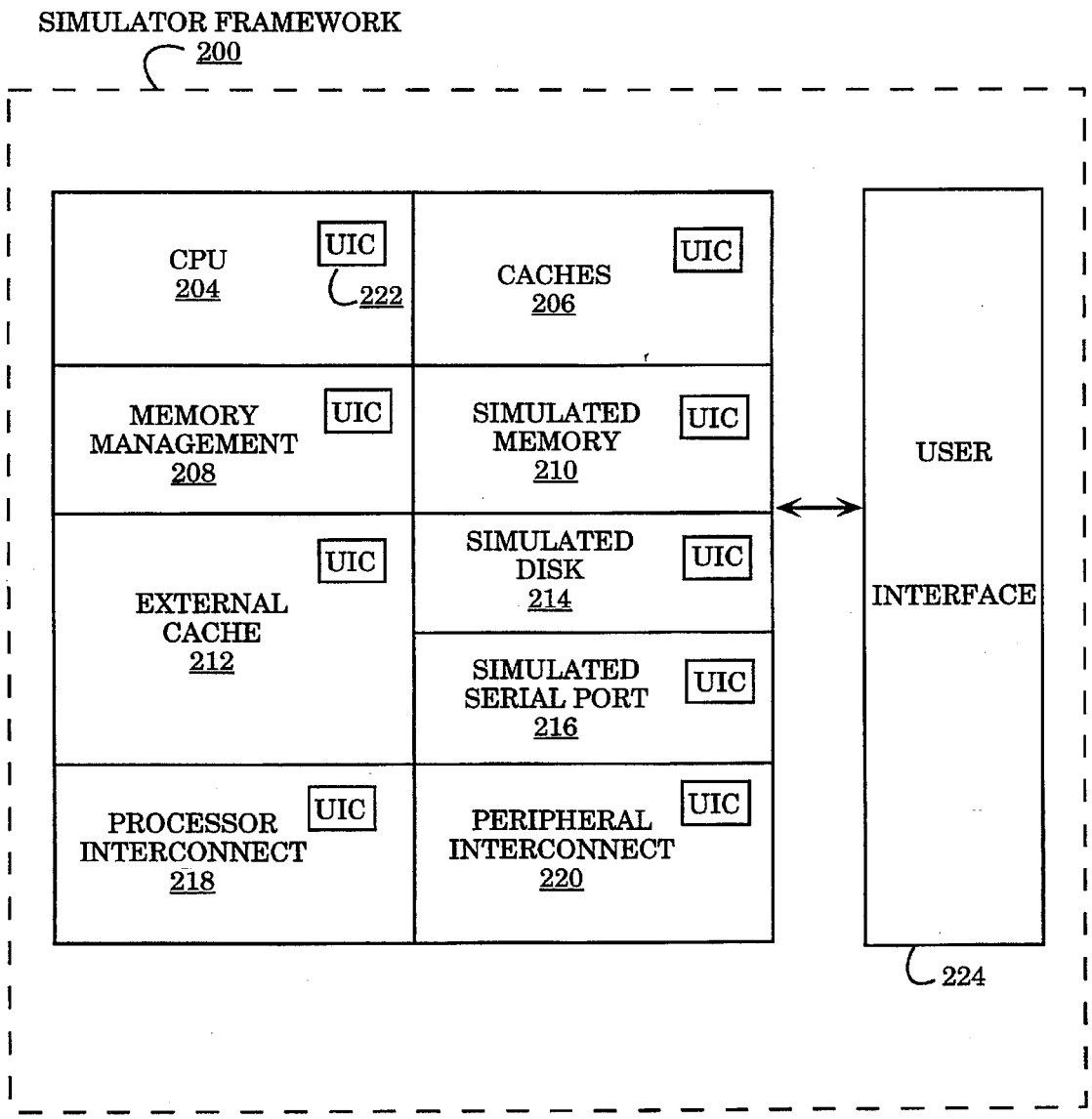
FIG. 2 illustrates an exemplary instance of a user interface coupled to a simulator framework with an exemplary simulated system.

FIG. 2 illustrates an exemplary instance of a user interface coupled to a simulator framework with an exemplary simulated system. Simulator framework 200 may be provided by any existing behavioral model including Sun Microsystem's MPSAS. A typical simulated system 202 may have various components including simulated CPU 204, simulated caches 206, simulated memory management 208, simulated memory 210, simulated external cache 212, simulated disk 214, simulated serial port 216, simulated processor interconnect 218 and simulated peripheral interconnect 220. Each simulated module includes user interface modules with different user interface commands (UIC) 222. Certain errors may be injected to certain modules of the simulated system through user interface 224.

For example, in order to test whether or not the simulated system is capable of overcoming misalignment errors, which typically occur in memory management 208, an inject error command may be directed to memory management 208's UIC 222. UIC 222 logs the command to test whether the error handling code is capable of correctly overcoming the misalignment error occurring in memory management 208.

With the present invention, such injection of errors may be performed at any time during which simulated system 202 is in execution. Thus, simulated system 202 may be executing and a user may input an error injection command while simulated system 202 is in execution. Although the command may be input or generated in various ways, such command may be input through keyboard 112 of computer 100 in the exemplary implementation of the present invention. The command is then parsed through user interface 224 and directed to a specific simulated module to be tested.

Once the error injection command, which includes the type of error to be tested and the range of addresses to be tested, are logged in the user interface module (UIC) 222 of the simulated module to be tested, simulated system 202 continues its execution. Once the instructions reaches a certain address range as specified in the error injection command supplied by the user, the type of error to be tested as specified by the user is caused in the specific simulated module to be tested. When the error is caused, the simulated module takes the same action as would be done by the actual hardware which may result in a trap. If the trap is enabled, the error handler is tested. Simulated system 202 continues execution until it hits another error address range within which a certain specified error needs to be tested.

Figure 3:
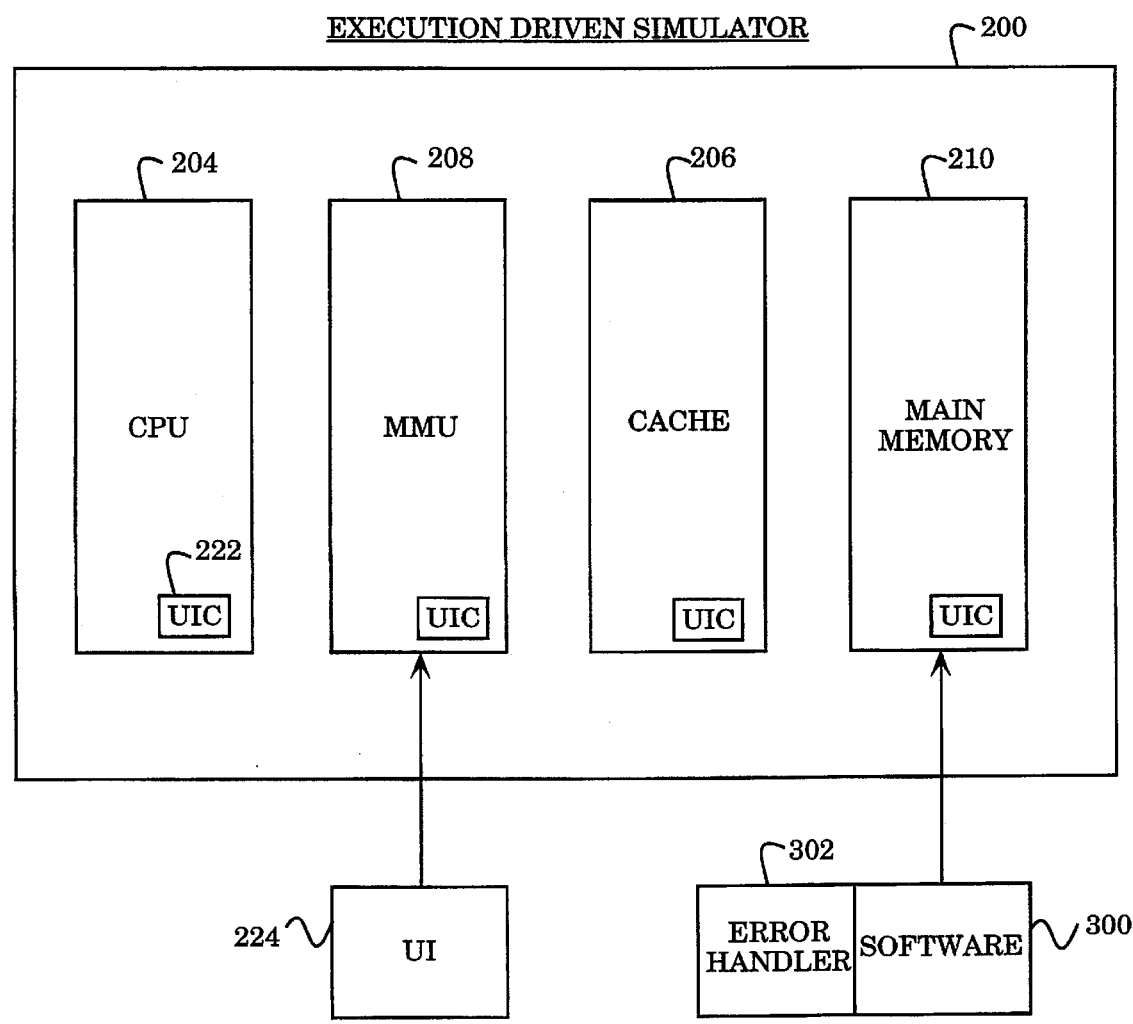
FIG. 3 illustrates a simulator framework 200 of FIG. 2 within exemplary software 300, such as an upgraded version of UNIX® to be executed in simulated main memory 210 of simulated system 202.

FIG. 3 illustrates a simulator framework 200 within exemplary software 300, such as an upgraded version of UNIX®, to be executed in simulated main memory 210 of simulated system 202. Software 300 has error handler 302 for handling and overcoming any errors that might present itself during the execution of software 300 by simulated hardware 202. Typically, error handler 302 is difficult to test. Portions of error handler 302 will not be executed unless certain errors do occur in the execution of the simulated system 202. With the present invention, however, errors may be injected at the appropriate address range of execution of simulated system 202.

Figure 4:
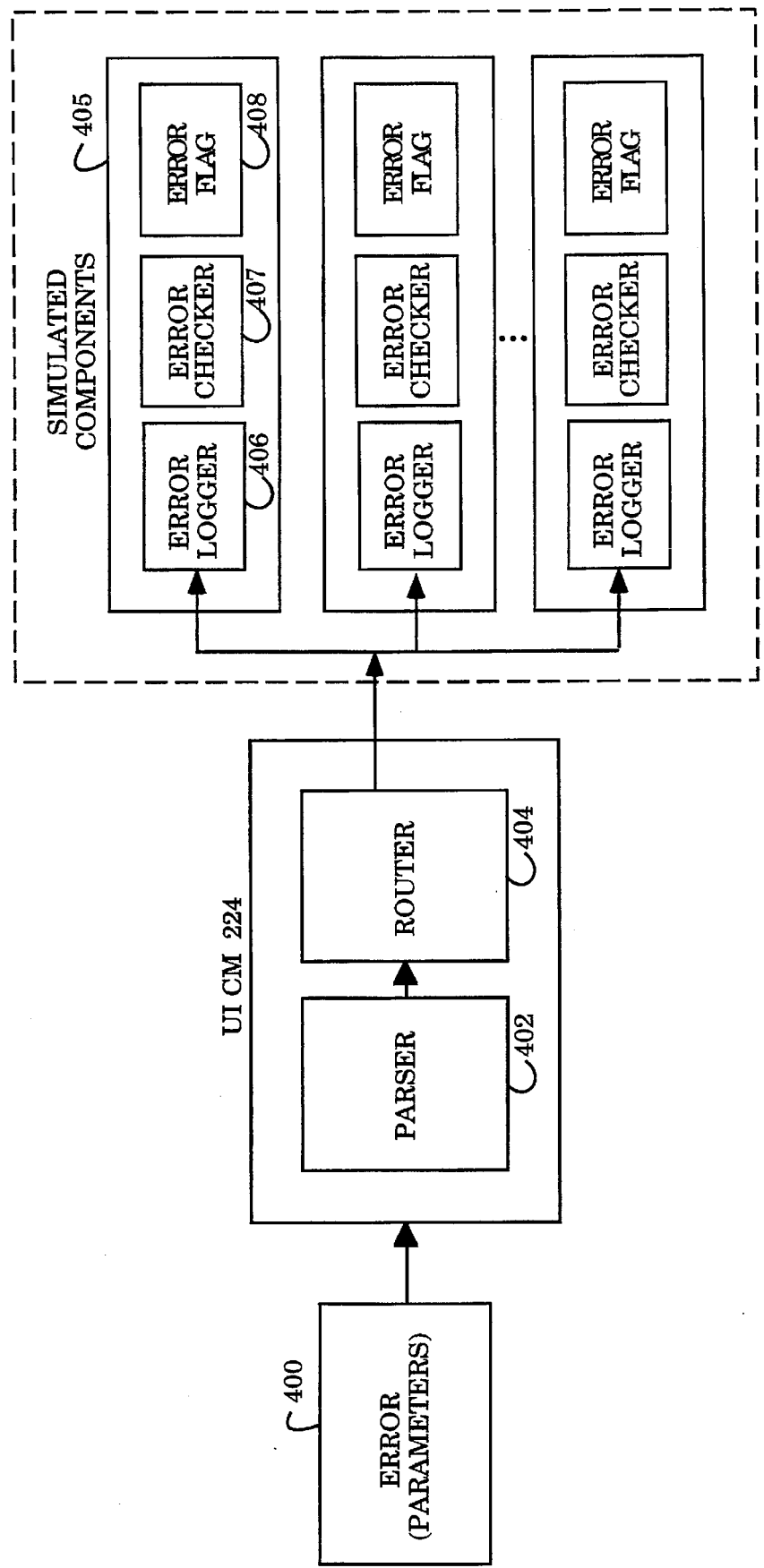
FIG. 4 illustrates an exemplary simplified error injection process.

FIG. 4 illustrates an exemplary simplified error injection process. Error parameter 400 with parameters including type of error to be injected and the address range to be tested is introduced to the simulated environment through user interface command module (UIC) 224. As soon as the error information is injected to the simulated hardware, error mechanism flag 408 is enabled.

User command module (UIC) 224 has parser 402 and router 404. Parser 402 parses the error information introduced to determine which simulated component 405 is to be tested for the particular error type and address range. Router 404 then routes the error information to appropriate simulated component 405 to be tested. Once the error information is with simulated component 405 to be tested, it is logged by error logger 406 of that particular simulated component 405. Error checker 407 checks for the appropriate address range within which the error introduced should be tested for each memory access made to an address and only if error mechanism flag 408 has been enabled.

Figure 5:
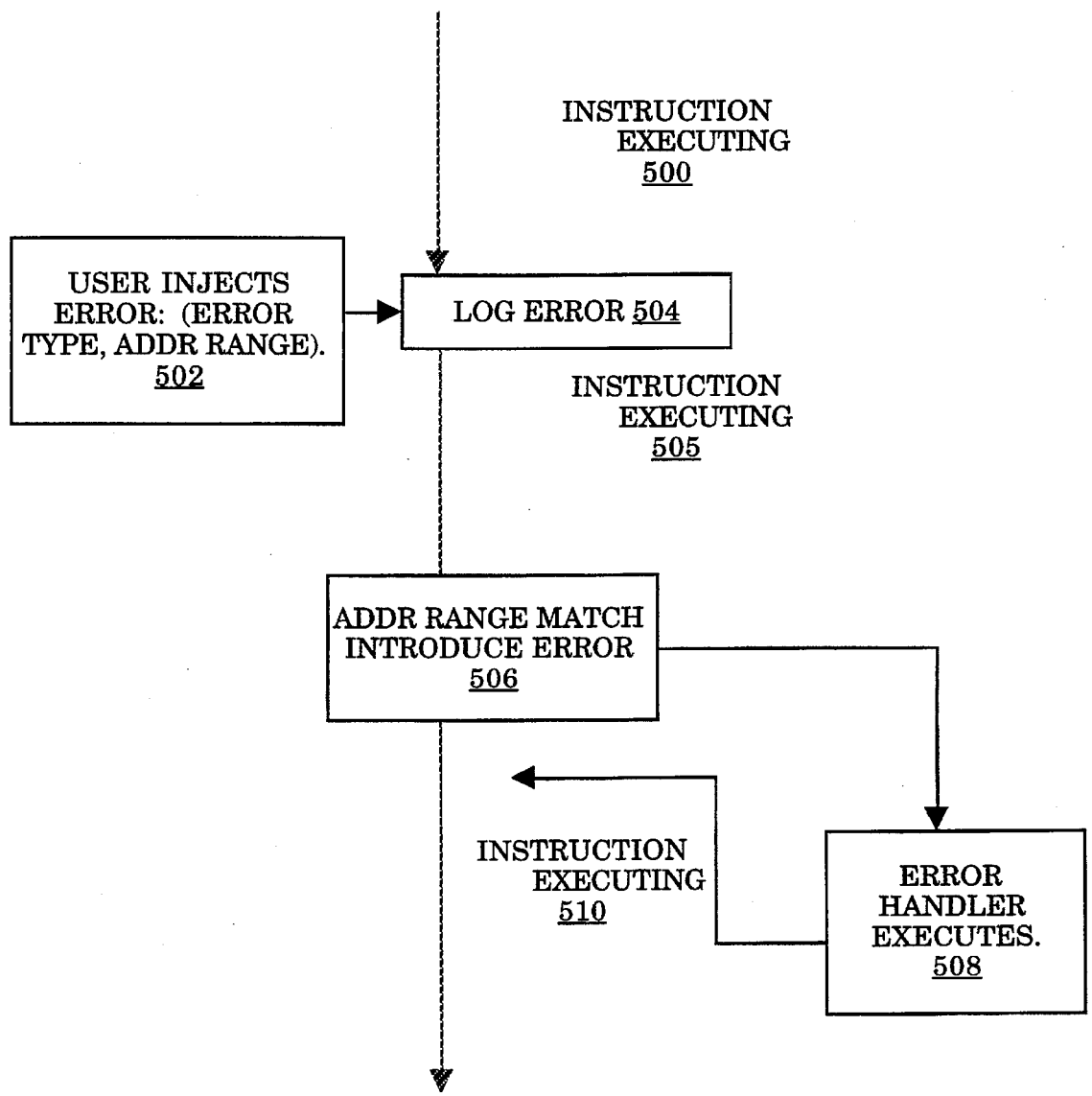
FIG. 5 illustrates the flow of instruction of simulated system 202 as an error gets injected.

FIG. 5 illustrates the flow of instruction for simulated system 202 as an error gets injected. Simulation of a hardware begins and the instruction of simulated system 202 begins executing (500). At some point during the execution of simulated system 202, a user may inject an error, specifying the error type and address range to be tested (502). Once such error information is injected to the simulated hardware, an error mechanism flag in the software state may be enabled.

The error is logged by error logger 406 of the specific simulated component to be tested (504). Error logger logs the error information in the simulator state of the specific simulated component. Such error information may be logged in a variable or any data structure. The general notion of simulator and/or software states are well known in the art and needs no further discussion. Instruction then resumes normal execution (505). While the simulated components of the simulated hardware is executing, each memory access is checked by an error checker to determine whether such memory access lies between the address range to be tested. The error checker is enabled and checking of each memory access only occurs if the error mechanism flag has been enabled.

When the appropriate address to be tested is encountered, the appropriate error type is introduced (506). If the traps are enabled, the process jumps to the error handler which begins execution (508). Once the error handler completes executing, if the error handler is working correctly, the process returns to the execution of the normal instructions where simulated system 202 left off (510). If the error injected is an uncorrectable or fatal error, the simulated hardware may behave as designed and described in its specific hardware documentation. For example, the simulated hardware upon encountering an uncorrectable error may shut down, or the error handler may go into a panic state.

Figure 6:
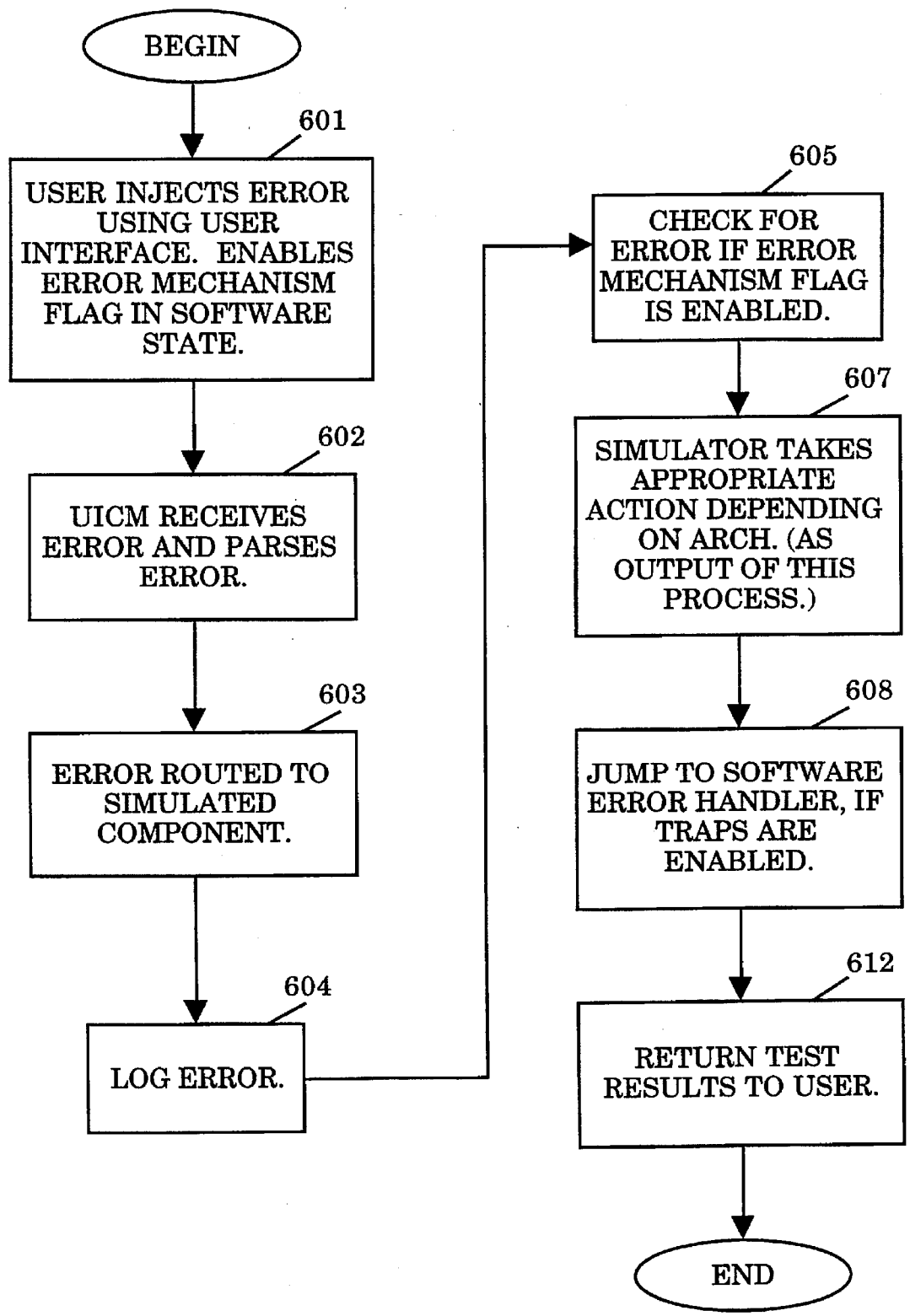
FIG. 6 is a flow diagram illustrating the general steps followed by the method and apparatus of the present invention.

FIG. 6 is a flow diagram illustrating the general steps followed by the method and apparatus of the present invention. In step 601, a user types an inject error command directed to a particular simulated module with certain parameters including the type of error to be handled and address range within which the test should be performed. An error mechanism flag is enabled as soon as the error is injected. Such error mechanism flag performs the function of enabling the error checker and may be in the software state of the simulated hardware. The flag may be implemented in various methods and would be understood by a person skilled in the art given the detailed description of the invention as given herein.

In step 602, this injected error information is received by user interface command module 224 which then parses the error information by using parser 402. Parser 402 parses this error information to determine which particular simulated component it needs to direct the error to. In step 603, the error information is then routed to the appropriate simulated component by router 404 of user interface command module 224. In step 604, the error information is then logged in the appropriate data structure (simulator state) of the simulated component by error logger 406. Data structures available in each simulated component include a data structure defining the address range (low address and high address), as well as the type of error to be tested.

In step 605, if the error mechanism flag has been enabled, the error checker checks for the appropriate address range within which the error introduced should be tested. As the simulated component with the error information executes, each memory access is compared to the address range within which the error is to be introduced as specified in the error information logged in the simulated component. Once there is a match of the address range to be tested, the error is generated by setting the appropriate bits in an error register. The bits in the error register are set in order to make it appear as though the error has occurred in the system. More specifically, in real hardware, certain bits in an error register or registers are set if an error does actually occur. In step 607, given that the error has been made to appear as though it has occurred, the simulator takes appropriate action depending on the architecture being simulated. In step 608, if the trap has been enabled, then the process jumps to the error handling code. The error handler then begins executing its instructions.

In step 612, the user is notified of whether or not the error handler was able to handle the particular error generated. This notification may be in the form of an explicit test result message output to the user on a monitor. In the alternative, the notification may also be implicitly made. For example, if the error to be tested is a correctable error and if the error handler is working correctly, then normal operation should resume after the error handler has completed its execution. Thus, once normal execution is resumed, the user may assume that the error handler has functioned correctly. If the error to be tested is an uncorrectable error, then the simulated system must react to the error by performing actions designated in its hardware specification. For example, an exemplary system being simulated may be designed to shut down without jumping to an error handler upon encountering an uncorrectable error. This result will also act as an implicit notification to the user that the error handler is working.

What has been described is a method and an apparatus for injecting error information for testing of a simulated hardware and software, more particularly for the testing of the software aspect of error handling. The present invention provides for an efficient and flexible method for testing the error handling code long before the actual hardware is developed.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for testing an error handler on a simulated hardware comprising the steps of:

dynamically injecting an error information specifying an address range and an error type into a plurality of simulated components to be tested, each said plurality of simulated components being part of said simulated hardware and having a user interface command coupled to a user interface module, said user interface module accepting said error information from a user while said simulated hardware is running and transmitting said error information to said user interface command for injecting said error type into said address range as specified by said error information transmitted;

causing said error type to occur in said address range of said simulated component upon a memory access to any one of said plurality of simulated components having said error information; and determining whether said error handler is correctly handling said error type.

2. The method of claim 1 wherein said step of injecting further comprising the step of using a user interface to receive said error information.

3. The method of claim 1 wherein said step of injecting further comprises the step of enabling an error mechanism flag.

4. The method of claim 1 wherein said step of injecting further comprises the step of parsing said error information and routing said error information to said plurality of simulated components.

5. The method of claim 4 further comprising the step of logging said error information in said plurality of simulated components.

6. The method of claim 1 wherein said step of causing further comprises the step of checking each said memory access to determine whether each said memory access is within said address range if an error mechanism flag has been enabled.

7. The method of claim 6 further comprising the step of setting bits in an error register if said memory access is within said address range.

8. The method of claim 1 wherein said step of determining further comprising the step of jumping to said error handler if traps are enabled.

9. An apparatus for testing an error handler on a simulated hardware comprising:

an error injection mechanism for dynamically injecting an error information including error type and an address range, said error information being dynamically injected into one of a plurality of simulated components of said simulated hardware while said simulated hardware is running, each said plurality of simulated components having a dedicated first user interface module for receiving said error information, said error injection mechanism causing said error type to occur within said address range to test whether said error handler is correctly handling said error type; and a second user interface module for allowing said dynamic injection of said error information into said simulated hardware, said second user interface module accepting said error information from a user while said simulated hardware is running and transmitting said error information to said dedicated first user interface module of any one of said plurality of simulated components.

10. The apparatus of claim 9 wherein said error injection mechanism further comprises an error mechanism flag for enabling an error checker.

11. The apparatus of claim 9 wherein said error injection mechanism further comprises an error checker for checking whether a memory access being made during an execution of said plurality of simulated components is within said address range.

12. The apparatus of claim 9 wherein said error injection mechanism further comprises a parser for parsing said error information.

13. The apparatus of claim 9 wherein said error injection mechanism further comprises a router for routing said error information to the appropriate said plurality of simulated components.

14. The apparatus of claim 9 wherein said error injection mechanism further comprises an error logger for logging said error information in said plurality of simulated components.

15. A computer system for testing an error handler on a simulated hardware comprising:

a storage element having, an error injection mechanism for dynamically injecting an error information including error type and address range, said error information being dynamically injected into any one of a plurality of simulated components of said simulated hardware while said simulated hardware is running, each said plurality of simulated components having a dedicated first user interface module for receiving said error information, said error injection mechanism causing said error type to occur within said address range to test whether said error handler is correctly handling said error type,
and a second user interface module for allowing said dynamic injecting of said error information into said simulated hardware, said second user interface module accepting said error information from said user while said simulated hardware is running and transmitting said error information to said dedicated first user interface module of any one of said plurality of simulated components; and a processor coupled to said storage element for executing said error injection mechanism.

16. The system of claim 15 wherein said error injection mechanism further comprises an error mechanism flag for enabling an error checker.

17. The system of claim 15 wherein said error injection mechanism further comprises an error checker for checking whether a memory access being made during an execution of said plurality of simulated components is within said address range.

18. The system of claim 15 wherein said error injection mechanism further comprises a parser for parsing said error information.

19. The system of claim 15 wherein said error injection mechanism further comprises a router for routing said error information to the appropriate said plurality of simulated components.

20. The system of claim 15 wherein said error injection mechanism further comprises an error logger for logging said error information in said plurality of simulated components.

* * * * *